(12) United States Patent
Wu (10) Patent No.: US 9,948,033 B1
(45) Date of Patent: Apr. 17, 2018

(54) PATCH PANEL STRUCTURE

(71) Applicant: HSING CHAU INDUSTRIAL CO., LTD., Taipei (TW)

(72) Inventor: Kei-Wei Wu, Taipei (TW)

(73) Assignee: HSING CHAU INDUSTRIAL CO., LTD. (TW)

( * ) Notice: Subject to any disclaimer, the term of this patent is extended or adjusted under 35 U.S.C. 154(b) by 0 days.

(21) Appl. No.: 15/641,366

(22) Filed: Jul. 5, 2017

(51) Int. Cl.
| | | |
|---|---|---|
| *H01R 24/00* | (2011.01) | |
| *H01R 13/6467* | (2011.01) | |
| *H01R 11/09* | (2006.01) | |
| *H01R 24/64* | (2011.01) | |
| H01R 107/00 | (2006.01) | |

(52) U.S. Cl.
CPC ......... *H01R 13/6467* (2013.01); *H01R 11/09* (2013.01); *H01R 24/64* (2013.01); *H01R 2107/00* (2013.01); *H01R 2201/04* (2013.01)

(58) Field of Classification Search
CPC .... H01R 13/6467; H01R 11/09; H01R 24/64; H01R 2107/00; H01R 2201/04
USPC ........................................... 439/43, 660, 676
See application file for complete search history.

(56) References Cited

U.S. PATENT DOCUMENTS

| | | | |
|---|---|---|---|
| 9,793,664 B2* | 10/2017 | Valenti | |
| 9,887,499 B2* | 2/2018 | Hirano et al. | |
| 2017/0302040 A1* | 10/2017 | Taylor | .................... H01R 27/02 |
| 2018/0007801 A1* | 1/2018 | Coffey | ................. H05K 5/0026 |
| 2018/0019537 A1* | 1/2018 | Maranto | ............ H01R 13/5825 |

* cited by examiner

*Primary Examiner* — Khiem Nguyen
(74) *Attorney, Agent, or Firm* — Schmeiser, Olsen & Watts, LLP (57) ABSTRACT

A patch panel structure includes a first jack row including a plurality of first network ports each having RJ-45 jack ends aligned in a first direction and arranged in a first row; a second jack row including a plurality of second network ports each having RJ-45 jack ends aligned in a second direction and arranged in a second row, wherein the first jack row and the second jack row are parallel, whereas the first direction and the second direction are opposite. Minimal alien crosstalk occurs between the network ports of the patch panel structure, thereby meeting strict transmission standards.

6 Claims, 11 Drawing Sheets

PATCH PANEL STRUCTURE

FIELD OF THE INVENTION

The present invention relates to patch panel structures and, more particularly, to a patch panel structure conducive to reduction of alien crosstalk.

BACKGROUND OF THE INVENTION

Recent explosive growth of data transmission speed results from rapid advancements of network-based transmission technology. According to existing Augmented Category 6 standard (such as TIA-568-C.2 and ISO-11801 ed.2) of an 10GBASE-T protocol of IEEE 802.3, with an RJ-45 connectors serving as standard interfaces for network connectors, the data transmission speed is 1000 times (10 Gbs/sec) higher than the initial speed (10 Mbs/sec), whereas the operating frequency increases from 16 MHz to 500 MHz. Given the ever-increasing transmission speeds and operating frequencies of broadband networks, it is important to reduce crosstalk. In this regard, crosstalk falls into two categories, namely internal crosstalk and alien crosstalk. The internal crosstalk occurs whenever unnecessary capacitive coupling or inductive coupling happens between internal wirings of a single network channel. The alien crosstalk occurs whenever unnecessary capacitive coupling or inductive coupling happens as a result of mutual interference of multiple network channels. In general, the routing of the internal circuitry of a single network channel and compensation mechanism can solve the aforesaid problems with internal crosstalk, whereas the aforesaid problems with alien crosstalk can be solved by widening the distance between multiple network channels.

Figure 1A:
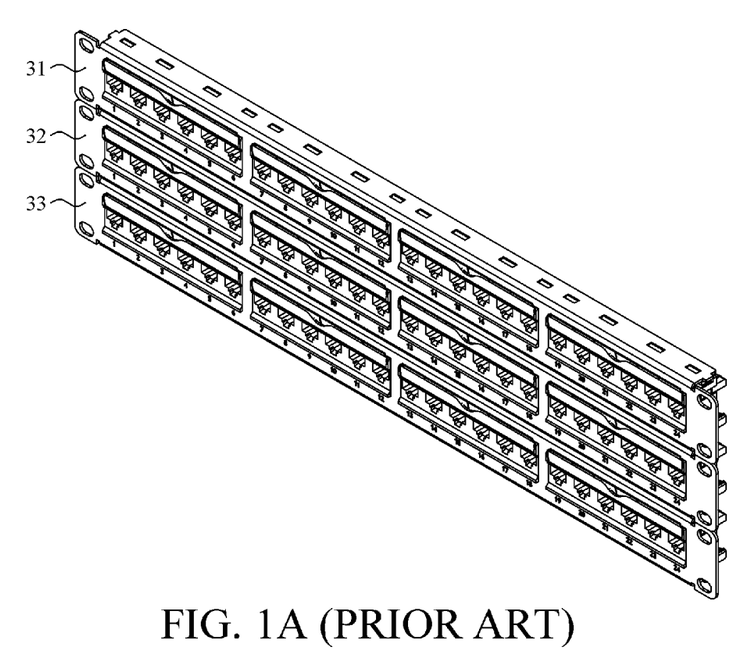
FIG. 1A (PRIOR ART) is a perspective view of stacked conventional patch panels.
Figure 1B:
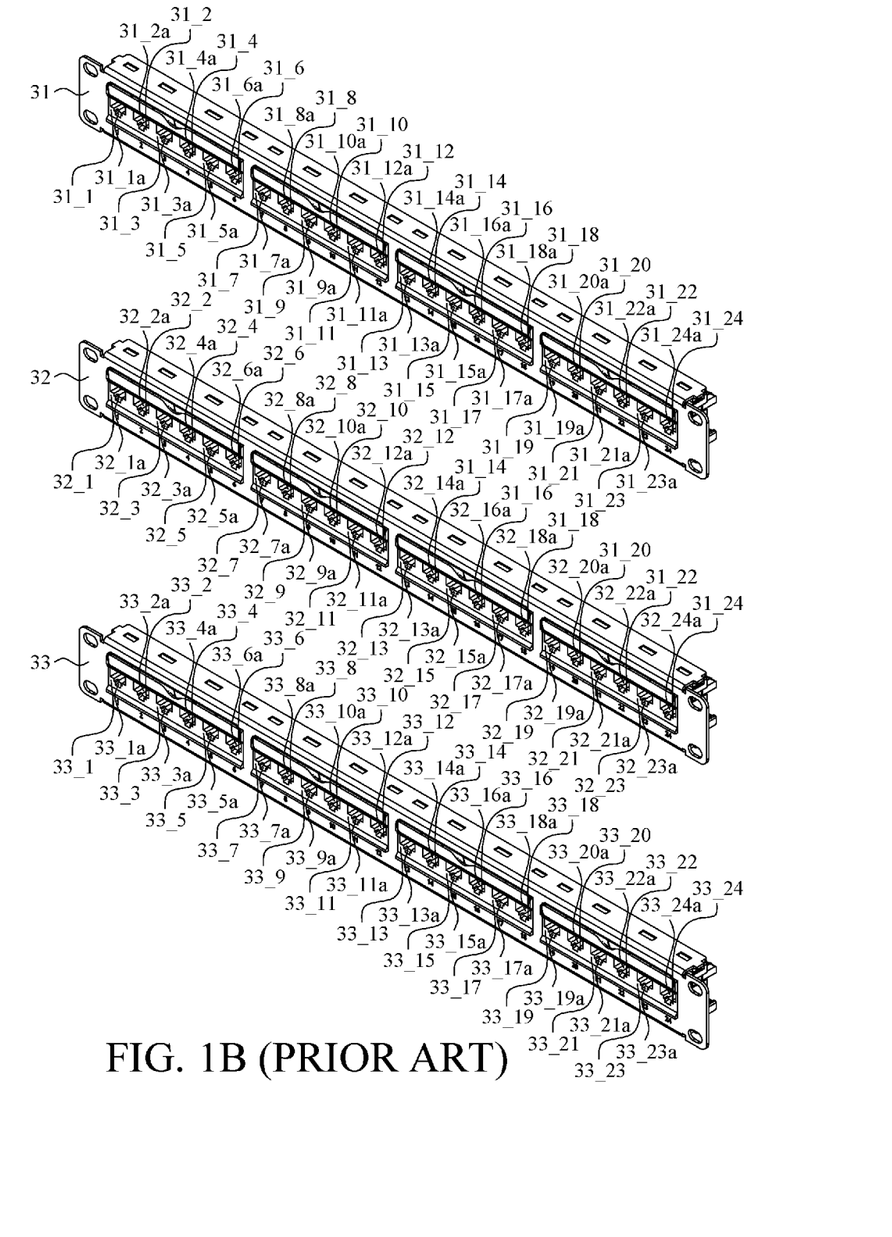
FIG. 1B (PRIOR ART) is an exploded view of stacked conventional patch panels.

Referring to FIG. 1A, FIG. 1B, FIG. 2 and FIG. 3, there are shown perspective, exploded, front and rear views of stacked conventional patch panels. As shown in FIG. 1A, conventional patch panels are snugly stacked. Only the exploded view of FIG. 1B shows reference numerals for the sake of convenience and illustration. However, persons skilled in the art understand that all conventional patch panels are snugly stacked. The patch panels 31, 32, 33 are stacked and are equal in dimensions and specifications. The patch panels 31, 32, 33 each include 24 network ports 31_~31_24, 32_~32_24, 33_~33_24. The network ports 31_1~31_24, 32_1~32_24, 33_1~33_24 have RJ-45 jack ends 31_1a~31_24a, 32_1a~32_24a, 33_1a~33_24a exposed from the front sides of the patch panels 31, 32, 33, respectively, and Insulation Displacement Connector (hereinafter referred to as "IDC") ends 31_1b~31_24b, 32_1b~32_24b, 33_1b~33_24b exposed from the rear sides of the patch panels 31, 32, 33, respectively. The network ports 31_1~31_24, 32_1~32_24, 33_1~33_24 are aligned in the same direction and arranged shoulder by shoulder. To comply with an EIA-310 standard, i.e., a useable dimension of 450 mm, the patch panels 31, 32, 33 are characterized in that it is necessary to space apart the centers of the network ports 31_~31_24 by 18.5 mm, space apart the centers of the network ports 32_1~32_24 by 18.5 mm, and space apart the centers of the network ports 33_1~33_24 by 18.5 mm.

Figure 4:
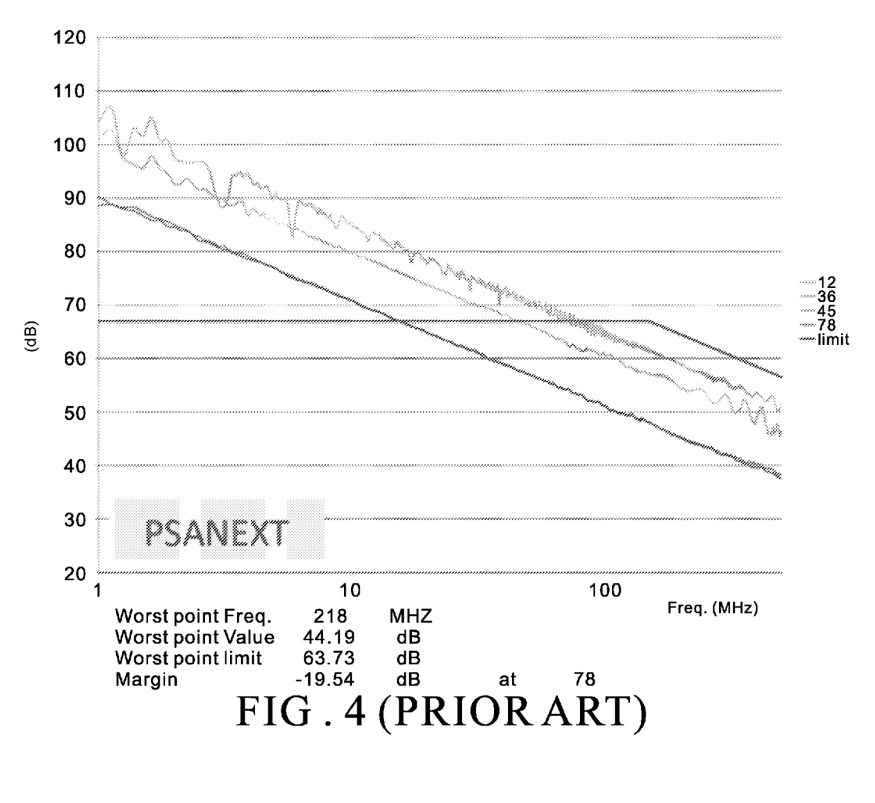
FIG. 4 (PRIOR ART) is a graph of alien crosstalk of a disturbed channel of conventional patch panel structures.

However, high-speed data transmission has a strict requirement of signal-to-noise ratio (SNR) and strict requirement of the SNR standard. Referring to FIG. 4, even though the conventional configuration of a patch panel maximizes the distance, i.e., 18.5 mm, between the network ports, the network ports are subjected to severe alien crosstalk to the detriment of the SNR thereof.

Figure 2:
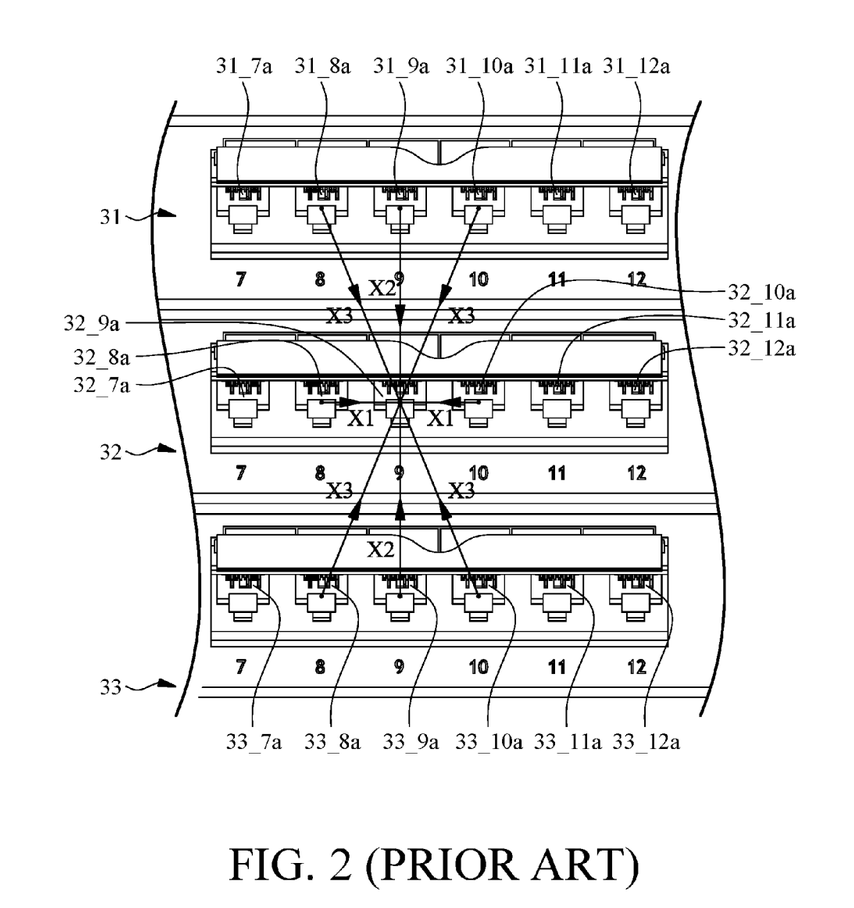
FIG. 2 (PRIOR ART) is a front view of stacked conventional patch panels.
Figure 3:
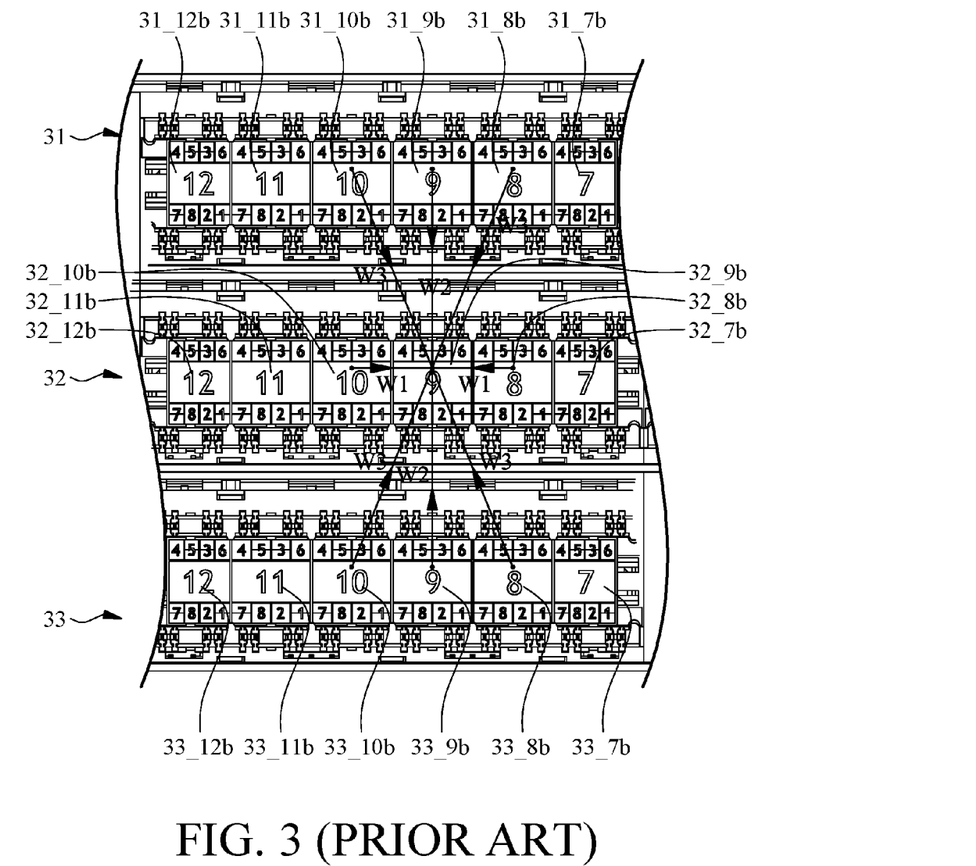
FIG. 3 (PRIOR ART) is a rear view of stacked conventional patch panels.

Referring to FIG. 2, FIG. 3, the network port 32_9 of the patch panel 32 functions as a disturbed channel, whereas the network ports 31_8, 31_9, 31_10 of the patch panel 31, the network ports 32_8, 32_10 of the patch panel 32, and the network ports 33_8, 33_9, 33_10 of the patch panel 33 function as disturbing channels. The distances between the centers of RJ-45 jack ends 32_9a of the network ports 32_9 and the centers of RJ-45 jack ends 32_8a, 32_10a of the network ports 32_8, 32_10 are each denoted with X1. The distances between the centers of RJ-45 jack ends 32_9a of the network ports 32_9 and the distances between the centers of RJ-45 jack ends 31_9a, 33_9a of the network ports 31_9, 33_9 are each denoted with X2. The distances between the centers of RJ-45 jack ends 32_9a of the network ports 32_9 and the distances between the centers of RJ-45 jack ends 31_8a, 31_10a, 33_8a, 33_10a of the network ports 31_8, 31_10, 33_8, 33_10 are each denoted with X3. The distances between the centers of IDC ends 32_9b of the network ports 32_9 and the distances between the centers of IDC ends 32_8b, 32_10b of the network ports 32_8, 32_10 are each denoted with W1. The distances between the centers of IDC ends 32_9b of the network ports 32_9 and the distances between the centers of IDC ends 31_9b, 33_9b of the network ports 31_9, 33_9 are each denoted with W2. The distances between the centers of IDC ends 32_9b of the network ports 32_9 and the distances between the centers of IDC ends 31_8b, 31_10b, 33_8b, 33_10b of the network ports 31_8, 31_10, 33_8, 33_10 are each denoted with W3. The greatest alien crosstalk occurs between the network ports spaced apart by distances X1, W1. Moderate alien crosstalk occurs between the network ports spaced apart by distances X2, W2. The least and thus negligible alien crosstalk occurs between the network ports spaced apart by distances X3, W3.

Accordingly, it is important to provide a patch panel structure conducive to the reduction in alien crosstalk and thus the compliance with strict related requirements.

SUMMARY OF THE INVENTION

It is an objective of the present invention to provide a patch panel structure which meets strict related requirements.

In order to achieve the above and other objectives, the present invention provides a patch panel structure, having a jack side and a terminal side, the patch panel structure comprising: a first jack row comprising a plurality of first network ports each having RJ-45 jack ends exposed from the jack side and each having IDC ends exposed from the terminal side, with the RJ-45 jack ends aligned in a first direction and arranged in a first row; and a second jack row comprising a plurality of second network ports each having RJ-45 jack ends exposed from the jack side and each having IDC ends exposed from the terminal side, with the RJ-45 jack ends aligned in a second direction and arranged in a second row; wherein the first jack row and the second jack row are parallel, whereas the first direction and the second direction are opposite; wherein the patch panel structure meets a predetermined standard.

In an embodiment of the present invention, the first jack row has 12 said first network ports.

In an embodiment of the present invention, the second jack row has 12 said second network ports.

In an embodiment of the present invention, RJ-45 jack ends of the first network ports and RJ-45 jack ends of the second network ports meet ANSI/TIA-568-C.2 standard and/or ISO/IEC 11801 standard.

In an embodiment of the present invention, the predetermined standard is an EIA-310 standard.

In an embodiment of the present invention, the IDC ends of the first network ports and the IDC ends of the second network ports have the same wiring scheme on the terminal side of the patch panel structure.

Hence, the patch panel structure of the present invention is characterized in that: given special network port configurations, minimal alien crosstalk occurs between the network ports of the patch panel structure, thereby meeting strict transmission standards, such as an ANSI/TIA-568-C.2 standard and/or ISO/IEC 11801 standard.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 5A:
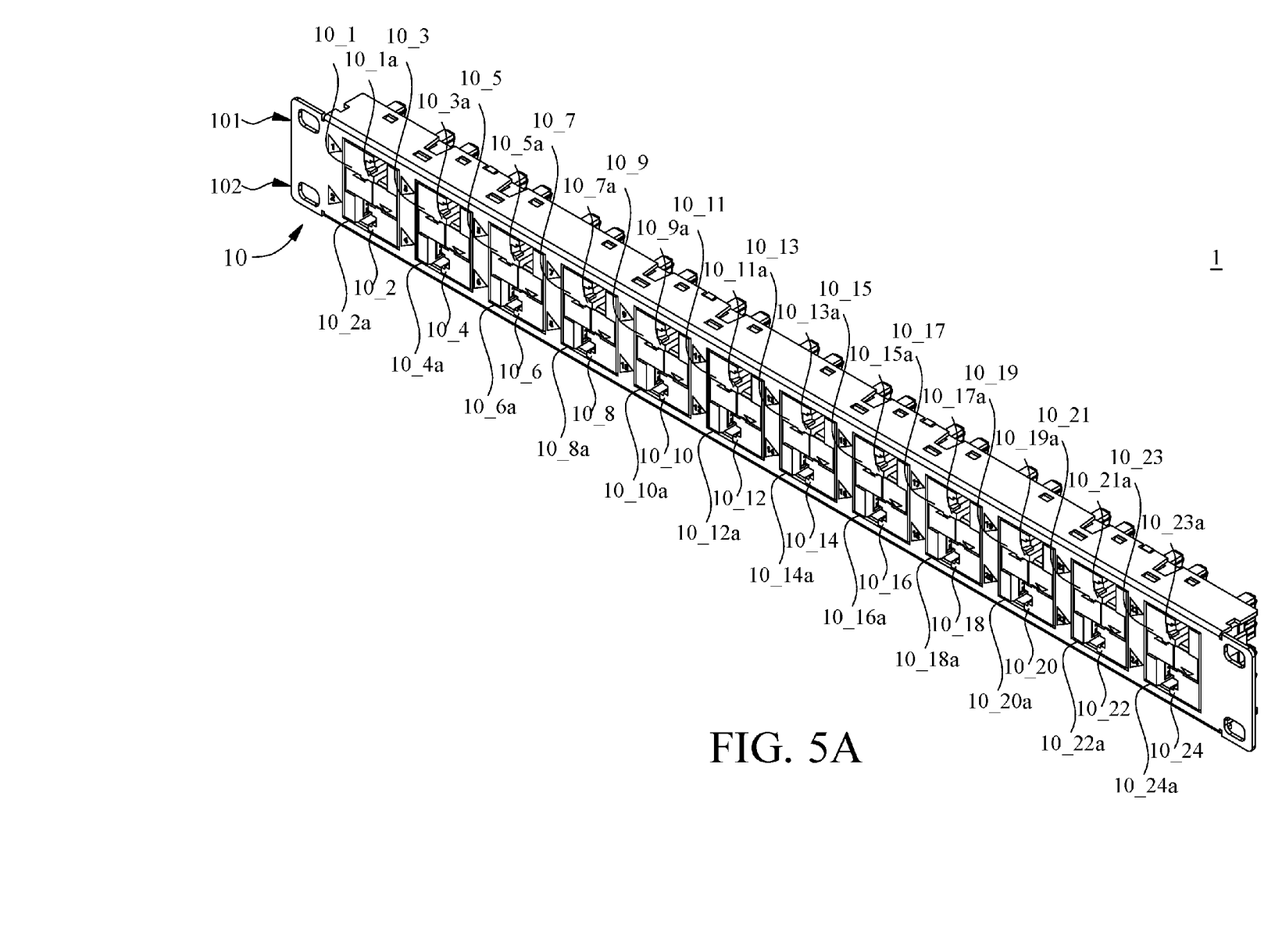
FIG. 5A and FIG. 5B are perspective views of a patch panel structure taken at different view angles according to an embodiment of the present invention, respectively.
Figure 5B:
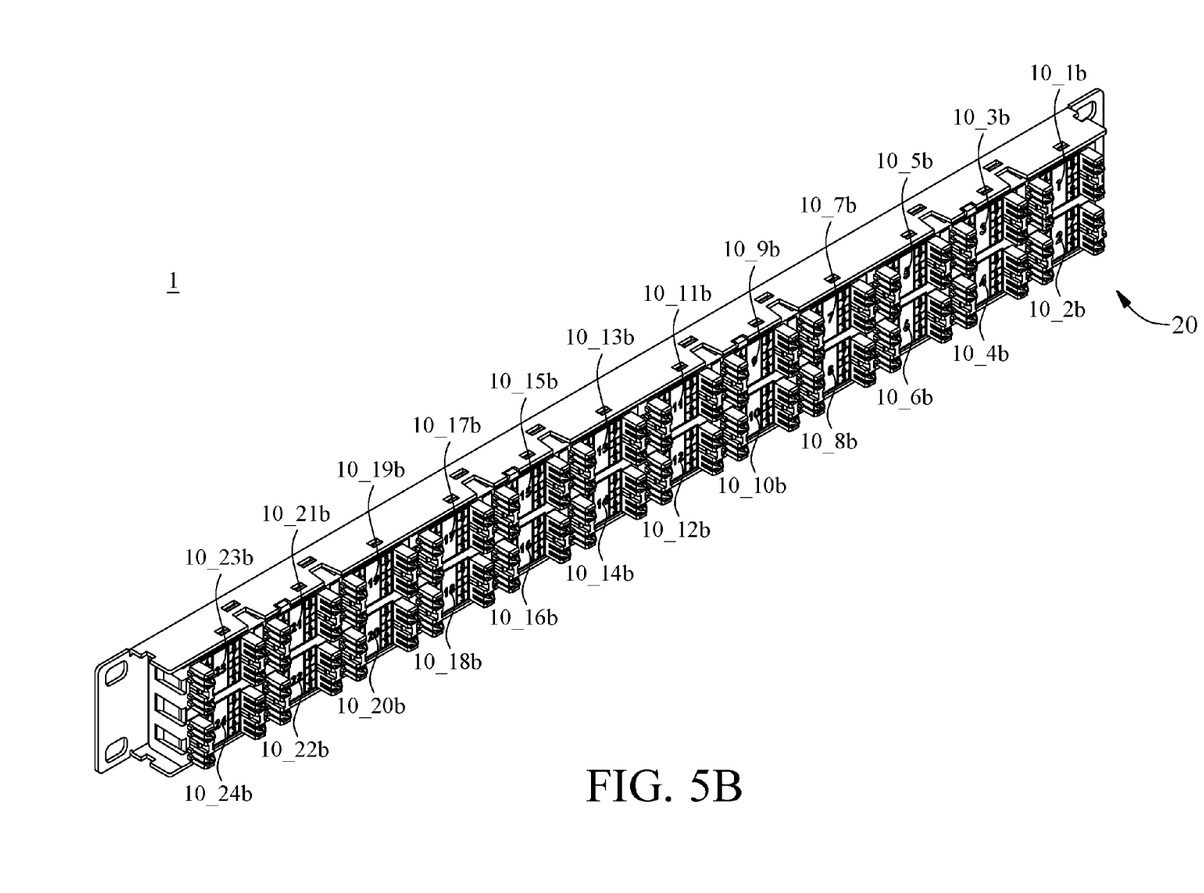
Figure 6A:
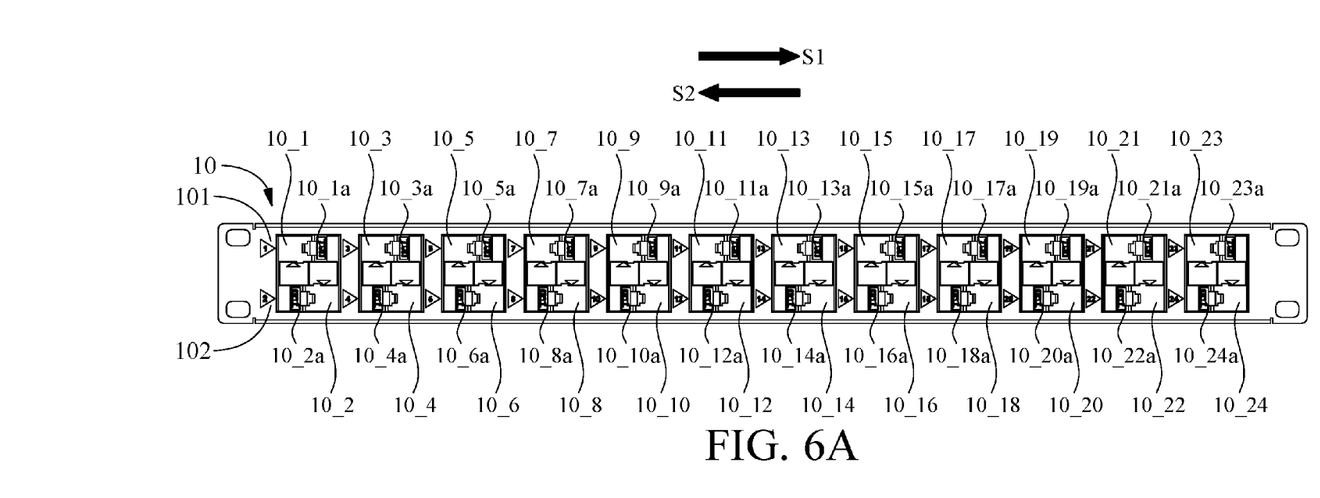
FIG. 6A and FIG. 6B are schematic views of the jack side and terminal side of the patch panel structure according to an embodiment of the present invention, respectively.
Figure 6B:
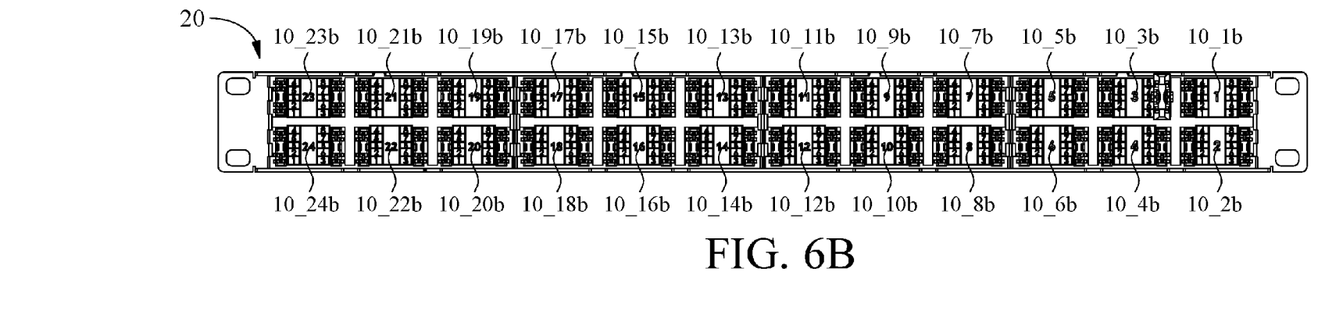

The present invention is illustrated with FIG. 5A, FIG. 5B, FIG. 6A and FIG. 6B. FIG. 5A and FIG. 5B are perspective views of a patch panel structure taken at different view angles according to an embodiment of the present invention, respectively. FIG. 6A and FIG. 6B are schematic views of the jack side and terminal side of the patch panel structure according to an embodiment of the present invention, respectively. As shown in the diagrams, a patch panel structure 1 has a jack side 10 and a terminal side 20. The patch panel structure 1 consists of 24 network ports, network ports 10_1~10_24 which are collectively arranged in a first jack row 101 and a second jack row 102, respectively. The 12 odd-numbered network ports 10_1, 10_3, 10_5, . . . , 10_23 are arranged in the first jack row 101. The 12 even-numbered network ports 10_2, 10_4, 10_6, . . . , 10_24 are arranged in the second jack row 102. The network ports 10_1~10_24 have RJ-45 jack ends 10_1a~10_24a which comply with ANSI/TIA-568-C.2 standard and/or ISO/IEC 11801 standard, and are exposed from the jack side 10, respectively, and IDC ends 10_1b~10_24b which are exposed from the terminal side 20, respectively.

With reference to its lengthwise direction, the patch panel structure 1 has two opposing ends, namely a first end and second end. The network ports 10_1, 10_3, 10_5, . . . , 10_23 each spin clockwise so that the RJ-45 jack ends 10_1a, 10_3a, 10_5a, . . . , 10_23a thereof are each closer to the first end than the second end of the patch panel structure 1. Referring to FIG. 6A, the first end and the second end are the right end and the left end which face the jack side 10 of the patch panel 1, respectively. The network ports 10_1, 10_3, 10_5, . . . , 10_23 each spin clockwise so that the RJ-45 jack ends 10_1a, 10_3a, 10_5a, . . . , 10_23a face the first end (right end) and are positioned distal to the second end (left end); hence, the RJ-45 jack ends 10_1a, 10_3a, 10_5a, . . . , 10_23a are aligned in a first direction S1 so that the network ports 10_1, 10_3, 10_5, . . . , 10_23 are arranged in the first jack row 101. The total length of the first jack row 101 does not exceed 450 mm to thereby meet an EIA-310 standard.

The network ports 10_2, 10_4, 10_6, . . . , 10_24 each spin counterclockwise so that the RJ-45 jack ends 10_2a, 10_4a, 10_6a, . . . , 10_24a thereof are each closer to the second end than the first end of the patch panel structure 1. Referring to FIG. 6A, the network ports 10_2, 10_4, 10_6, . . . , 10_24 each spin counterclockwise so that the RJ-45 jack ends 10_2a, 10_4a, 10_6a, . . . , 10_24a face the second end (left end) and are positioned distal to the first end (right end); hence, the RJ-45 jack ends 10_2a, 10_4a, 10_6a, . . . , 10_24a are aligned in a second direction S2 so that the network ports 10_2, 10_4, 10_6, . . . , 10_24 are arranged in the second jack row 102. The total length of the second jack row 102 does not exceed 450 mm, so as to comply with an EIA-310 standard. Furthermore, the first jack row 101 and the second jack row 102 are parallel, whereas the first direction S1 and the second direction S2 are opposite.

To facilitate the practical installation performed on the patch panel structure 1 on the terminal side 20, it is necessary for an internal circuit board (not shown) of the network ports 10_1, 10_3, 10_5, . . . , 10_23 of the first jack row 101 to follow a first circuitry and for an internal circuit board (not shown) of the network ports 10_2, 10_4, 10_6, . . . , 10_24 of the second jack row 102 to follow a second circuitry so that, given the different circuitry, the IDC ends 10_1b, 10_3b, 10_5b, 10_23b of the network ports 10_1, 10_3, 10_5, . . . , 10_23 have the same wiring scheme as the IDC ends 10_2b, 10_4b, 10_6b, . . . , 10_24b of the network ports 10_2, 10_4, 10_6, . . . , 10_24 on the terminal side 20 of the patch panel structure 1. Hence, the IDC ends of the network ports on the first jack row 101 and the IDC ends of the network ports on the second jack row 102 have the same wiring scheme.

Figure 7:
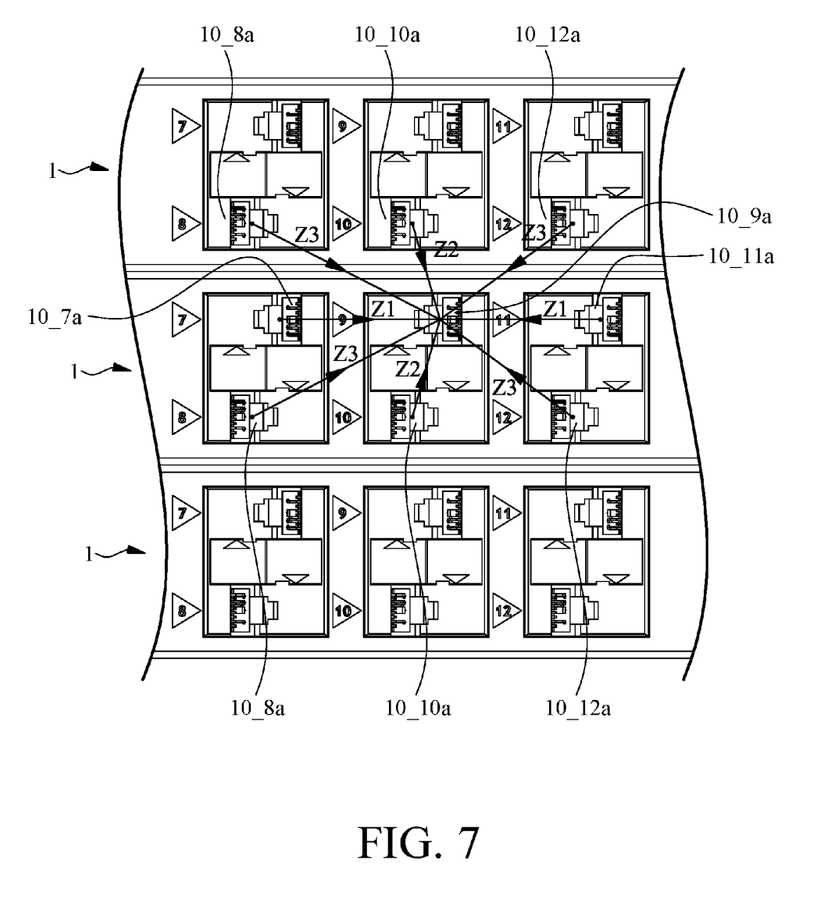
FIG. 7 is a front view of three stacked patch panel structures according to an embodiment of the present invention.
Figure 8:
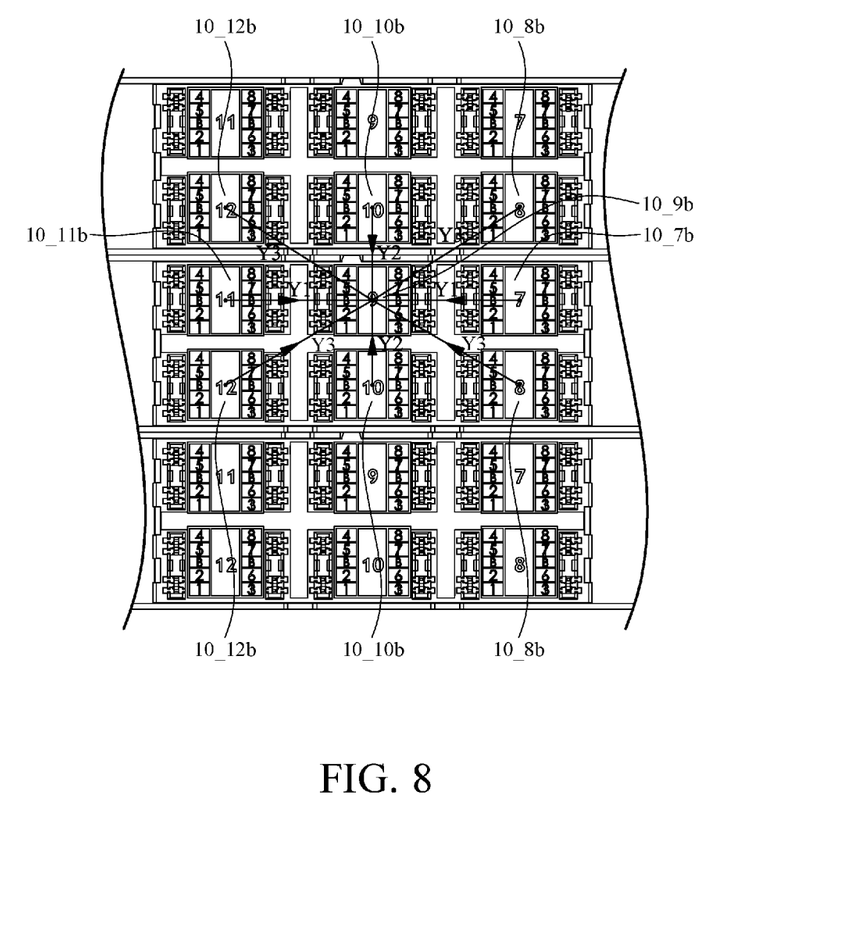
FIG. 8 is a rear view of the three stacked patch panel structures according to an embodiment of the present invention.

Referring to FIG. 7 and FIG. 8, there are shown front and rear views of three stacked patch panel structures 1 according to an embodiment of the present invention. Referring to FIG. 7 and FIG. 8, regarding the patch panel structure 1, the centrally-located network port 10_9 functions as a disturbed channel, whereas the peripheral network ports function as disturbing channels. On the jack side 10 of the patch panel structure 1, the central distances between the RJ-45 jack end 10_9a of the network port 10_9 and the RJ-45 jack ends of the flanking network ports are each denoted with Z1, the central distances between the RJ-45 jack end 10_9a of the network port 10_9 and the RJ-45 jack ends of the upper and lower network ports are each denoted with Z2, the central distances between the RJ-45 jack end 10_9a of the network port 10_9 and the RJ-45 jack ends of the four cornered network ports are each denoted with Z3. On the terminal side 20 of the patch panel structure 1, the central distances between the IDC end 10_9b of the network port 10_9 and the IDC ends of the flanking network ports are each denoted with Y1, the central distances between the IDC end 10_9b of the network port 10_9 and the IDC ends of the upper and lower network ports are each denoted with Y2, the central distances between the IDC end 10_9b of the network port 10_9 and IDC ends of the four cornered network ports are each denoted with Y3. Given the special configurations of the present invention, under an EIA-310 standard, the distance between the disturbed channel and each of the disturbing channels is maximized. Referring to FIG. 2 and FIG. 3, the RJ-45 jack ends on the jack side 10 of the patch panel structure 1 are spaced apart by a distance at least two times longer than their conventional counterparts, with, for example, Z1 being two times larger than X1, whereas the RJ-45 jack ends on the terminal side 20 of the patch panel structure 1 are spaced apart by a distance at least 1.5 times longer than their conventional counterparts, with, for example, Y1 being 1.5 times larger than W1.

Figure 9:
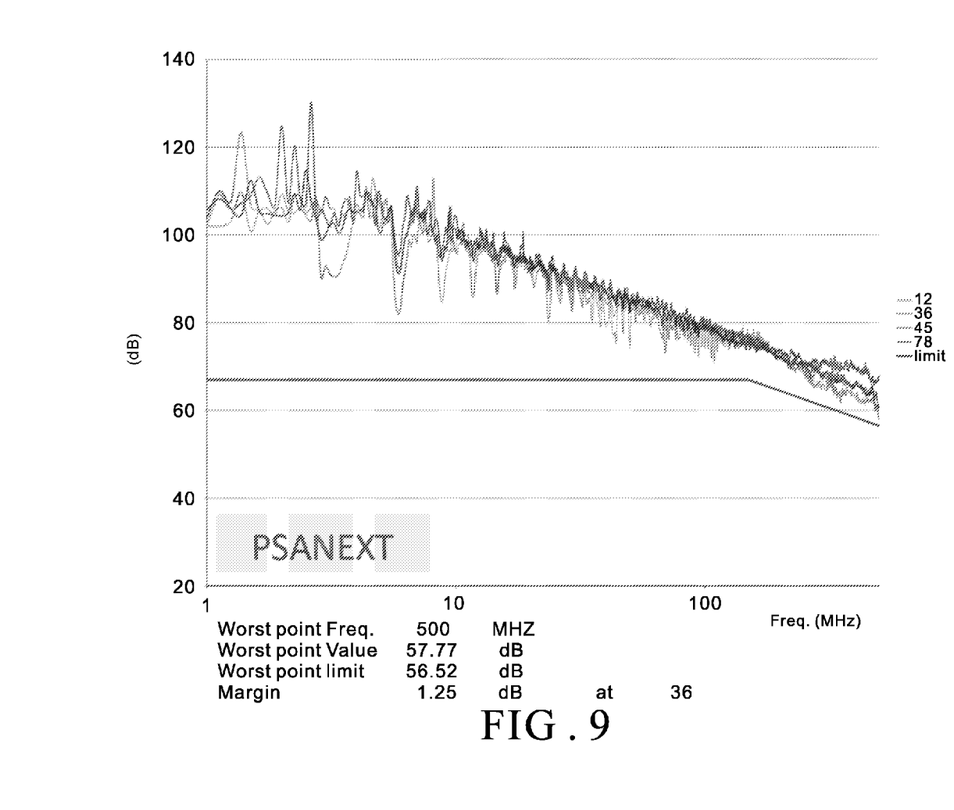
FIG. 9 is a graph of alien crosstalk of a disturbed channel of the patch panel structures according to an embodiment of the present invention.

Referring to FIG. 9, there is shown a graph of alien crosstalk of a disturbed channel of the patch panel structure 1 according to an embodiment of the present invention. By increasing the distance between the adjacent network ports, alien crosstalk which occurs to the first through fourth differential motions of the network port, such as the centrally located network port 10_9 of patch panel structure 1 shown in FIG. 6, of a disturbed channel, always surpasses standard specified limitation. Therefore, the patch panel structure 1 of the present invention is effective in reducing alien crosstalk, thereby meeting strict related requirements.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A patch panel structure, having a jack side and a terminal side, the patch panel structure comprising:
    a first jack row comprising a plurality of first network ports each having RJ-45 jack ends exposed from the jack side and each having IDC ends exposed from the terminal side, with the RJ-45 jack ends aligned in a first direction and arranged in a first row; and
    a second jack row comprising a plurality of second network ports each having RJ-45 jack ends exposed from the jack side and each having IDC ends exposed from the terminal side, with the RJ-45 jack ends aligned in a second direction and arranged in a second row,
    wherein the first jack row and the second jack row are parallel, whereas the first direction and the second direction are opposite,
    wherein the patch panel structure meets a predetermined standard.

2. The patch panel structure of claim 1, wherein the first jack row has 12 said first network ports.

3. The patch panel structure of claim 1, wherein the second jack row has 12 said second network ports.

4. The patch panel structure of claim 1, wherein RJ-45 jack ends of the first network ports and RJ-45 jack ends of the second network ports meet ANSI/TIA-568-C.2 standard and/or ISO/IEC 11801 standard.

5. The patch panel structure of claim 1, wherein the predetermined standard is an EIA-310 standard.

6. The patch panel structure of claim 1, wherein the IDC ends of the first network ports and the IDC ends of the second network ports have the same wiring scheme on the terminal side of the patch panel structure.

* * * * *